United States Patent Office 3,287,379
Patented Nov. 22, 1966

3,287,379
7α-METHYL-5α-ANDROSTANOLONE DERIVATIVES
Josef Hader, Friedmund Neumann, and Rudolf Wiechert, all of Berlin, Germany, assignors to Schering A.G., Berlin, Germany
No Drawing. Filed Aug. 26, 1965, Ser. No. 482,892
Claims priority, application Germany, Aug. 26, 1964,
Sch 35,682
4 Claims. (Cl. 260—397.4)

This invention relates to novel 5α-androstanolone derivatives of the general formula

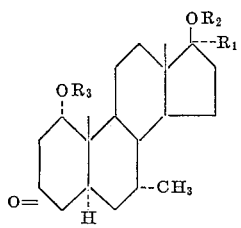

wherein $R_1$ is hydrogen or a lower alkyl and $R_2$ as well as $R_3$ are hydrogen or residues of physiologically acceptable acids.

It is an object of the present invention to provide steroid compounds that combine a strong anabolic action with a good differentiation of anabolic and androgenic effects.

It is a further object of the invention to form steroids having the properties just set forth which can be applied both orally and subcutaneously.

It is a more specific object of the present invention to form androstanolone derivatives which have the properties stated in the two preceding paragraphs.

A still further object of the invention is a method which is useful for manufacture on an industrial scale whereby androstanolone derivatives of the type indicated can be formed.

These and other objects of the invention will be apparent from the following description of the compound and the manner of manufacture.

A way of making the compounds above defined proceeds from 2-halogen steroids of the general formula

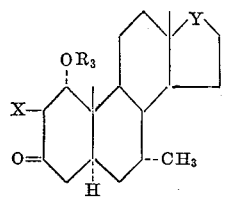

wherein X is chlorine or bromine and wherein Y is a

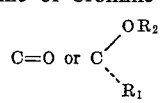

group. These compounds are first subjected to a process for removal of the halogen atom. In cases where Y stands for $C=O$ a 17α alkyl group is then introduced by way of a Grignard action or in a chemically equivalent manner. The 3-keto group is for this purpose protected by a preceding ketalization. The protective group is later removed.

If there is present in the original compound a 17-acyloxy group or after such group has been introduced by an intermediate step as just described, there follows finally either saponification of the 17-acyloxy group or an esterification of the free hydroxyl groups that may be present in the 1 and 17-position. These last steps depend on what type of groups are desired in the final product as $R_2$ and $R_3$.

To remove the halogen atom it is convenient, apart from catalytic hydrogenation, to subject the starting product to a reduction with metals or metal salts. As indicated, the starting product may have an unreacted or esterified hydroxyl group in the 17-position. If it is desired to use 1,17-diesters of various acids, one preferably proceeds from compounds which have already the desired acyloxy group in the 17-position and thus affects only the esterification of the hydroxyl group which is being introduced in the 1-position. If a saponification of the 17-acyloxy group is desired after the introduction of the hydroxyl group into the 1-position, it is necessary to provide for a temporary ketalization of the 3-keto group.

The compounds which are used herein as starting products are obtained by addition of hypochloric or hypobromic acid to the $\Delta^1$ double bond of the corresponding 7α-methyl-$\Delta^1$-androstenolone or 7α-methyl-$\Delta^1$-androstenedione.

As already stated, the novel compounds are distinguished by a strong anabolic action together with a desirable differentiation between anabolic and androgenic effects and they can be administered subcutaneously and also orally. For the oral application, the 17-alkyl compositions are preferred.

The following table gives a comparison of the values obtained in respect of the anabolic and androgenic action, comparing the 7α - methyl-5α-androstane-1α,17β-diol-3-one-17-acetate with two comparative compounds.

Table

| No. | Compound | Seminal Vesicle (mg./100 g. Rat) | Levator ani (mg./100 g. Rat) |
|---|---|---|---|
| I | 7α-methyl-5α-androstano-1α, 17β-diol-3-one-17-acetate | 350 | 73 |
| II | 7α-methyl-$\Delta^1$-5α-androstene-17β-ol-3-one-17-acetate | 600 | 58 |
| III | Testosterone propionate | 490 | 54 |

The stated values are obtained in the Levator ani-Seminal Vesicle test using castrated male rats after twelve subcutaneous injections of a daily dose of 1 mg. per animal.

The starting products which do not form the subject matter of the present application may be obtained as follows:

(a) This reaction proceeds from 7α-methyl-5α-androstane-17β-ol-3-one which is obtained by a Birch reduction from the well known 7α-methyl-$\Delta^4$-androstene-17β-ol-3-one and has a melting point between 189.5 and 190.5° C. 5.2 g. of this androstane derivative are dissolved in 25 ml. pyridine and are acylated by addition of 12 ml. acetic acid anhydride in a reaction taking place overnight at room temperature. The reaction product is added upon stirring to ice water, is slightly acidified with dilute HCl and is extracted with $CH_2Cl_2$. After washing of the methylene chloride phase with water, drying and concentration, recrystallization of the residue is effected from isopropyl-ether. There are obtained 5.3 g. 7α-methyl-5α-androstane-17β-ol-3-one-17-acetate, M.P. 138–140° C. 5.3 g. of this latter compound are dissolved in 250 ml. THF, 2 drops of HBr/AcOH are added and 0.8 ml. (2.5 g.) of bromine dissolved in 25 ml. glacial acetic acid are added upon stirring at a temperature of 10–15° C. After all of the bromine has been decolorized, the mixture is stirred into an ice soda solution, extracted with $CH_2Cl_2$, washed until it is neutral, dried and concentrated by evaporation in vacuo. The remaining residue is recrystallized from isopropylether. There are obtained 4.96 g. 2α-bromo-7α-methyl-5α-androstane-17β-ol-3-one-17-acetate, M.P. 190.5–191° C.

4.95 g. of the latter compound are dissolved in 132 ml. dimethylformamide whereupon 3.3 g. $CaCO_3$+ 1.6 g. LiBr are added. The mixture is heated upon stirring to 115° C. during a period of five hours and under a nitrogen atmosphere. It is then permitted to cool and the undissolved inorganic components are removed by filtration. The filtrate is then concentrated in vacuo to one-half of the original volume and stirred into ice water. It is thereafter slightly solidified with dilute HCl, the residue is removed by suction and is then absorbed in $CH_2Cl_2$, washed, dried and evaporated. After recrystallization of the crude product from isopropylether, one obtains 2.42 g. 7α-methyl-$\Delta^1$-5α-androstene-17β-ol-3-one-17-acetate, M.P. 120–121° C.

UV: $\epsilon_{229}=10,700$.

(b) 500 mg. 7α-methyl-$\Delta^1$-5α-androstene-17β-ol-3-one-17-acetate are dissolved in 30 ml. of methanol, 5 ml. 2 N NaOH are added and the mixture is heated under reflux and in a nitrogen atmosphere for one-half hour. It is then permitted to cool, is added by stirring to ice water, is acidified with dilute HCl, extracted with methylene chloride, washed, dried and concentrated in vacuo. The residue is recrystallized from isopropylether-acetone. There is obtained 7α-methyl-$\Delta^1$-5α-androstene-17β-ol-3-one; UV: $\epsilon_{229}=10,650$.

(c) 302.5 mg. of 7α-methyl-$\Delta^1$-5α-androstene-17β-ol-3-one are dissolved in 1 ml. dry pyridine. 0.70 ml. propionic acid anhydride are added and the mixture is permitted to stand at room temperature for fifteen hours. After stirring into ice water and acidifying with dilute HCl, extraction is effected with $CH_2Cl_2$. The methylene chloride phase is washed until neutral, dried and concentrated in vacuo. The residue is recrystallized from isopropylether. There is obtained 7α-methyl-$\Delta^1$-5α-androstene-17β-ol-3-one-17-propionate; F. 98–99° C. UV: $\epsilon_{229}=9,900$.

(d) 1 g. of 7α-methyl-$\Delta^1$-5α-androstene-17β-ol-3-one is dissolved in 50 ml. absolute benzene whereupon 25 mg. p-toluenesulfonic acid and 2.5 ml. of ethylene glycol are added and the mixture is heated under reflux upon stirring in a nitrogen atmosphere for 48 hours upon continuous elimination of water. The benzene solution is then washed with about 1 N NaOH and with water and after drying and concentration in vacuo is subjected to chromatography with neutral $Al_2O_3$+1% $H_2O$ and is subjected to elution with benzene. Apart from a small amount of the starting product, one obtains 7α-methyl-$\Delta^1$-5α-androstene-17β-ol-3-one-3-ethylene-ketal which can be further processed without additional purification.

Using 10 ml. pyridine and 1 g. $CrO_3$, one forms a pyridine-chromic acid complex to which there are added upon stirring at room temperature 1 g. of 7α-methyl-$\Delta^1$-5α-androstene-17β-ol-3-one-3-ethyleneketal which is dissolved in 10 ml. pyridine. After eight hours of stirring at room temperature, one concentrates in vacuo up to dryness and subjects the residue to filtration with methylene chloride over neutral $Al_2O_3$. After concentration of the filtrate and recrystallization of the residue one obtains 7α-methyl-$\Delta^1$-5α-androstene-3,17-dione-3-ethylene-ketal.

A Grignard solution is prepared from 1.35 g. magnesium filings, 3 ml. methyl iodide and 17 ml. absolute ether. This solution is reacted dropwise at 0° C. with 0.70 g. 7α-methyl-$\Delta^1$-5α-androstene-3,17-dione-3-ethylene-ketal in 50 ml. benzene. The reaction mixture is subjected to stirring at room temperature for four hours and is then decomposed at 0° C. with an aqueous solution of ammonium chloride. The reaction mixture is extracted with ether, the ether is washed until neutral, is dried with $Na_2SO_4$ and is concentrated in vacuo up to dryness. The residue obtained is taken up in 30 ml. methanol, 0.8 ml. of 8% (volume) sulfuric acid are added and the mixture is heated for 30 minutes upon refluxing in a nitrogen atmosphere. After cooling, the mixture is stirred into ice water that contains 500 mg. soda and is extracted with $CH_2Cl_2$. The product is washed until neutral, dried and evaporated. The residue is recrystallized from isopropylether. There are obtained 7α, 17α-dimethyl-$\Delta^1$-5α-androstene-17β-ol-3-one.

The following examples will illustrate the making of the compounds of the invention from the just described starting products.

*Example 1*

345 mg. of 7α-methyl-$\Delta^1$-5α-androstene-17β-ol-3-one-17-acetate are dissolved in 10 ml. dioxane and are reacted upon stirring successively with 1 ml. $H_2O$, 0.1 ml. (70%) $HClO_4$, 150 mg. N-bromacetamide. After two hours of stirring at room temperature, one destroys the excess of perchloric acid with a 5% solution of $NaHSO_3$ and stirs the reaction mixture into ice water. The residue thus obtained is removed by suction, washed with water and dried in vacuo. The resulting crude product is recrystallized from isopropylether/$CH_2Cl_2$. There are obtained 220 mg. of 2β-bromo-7α-methyl-5α-androstane-1α,17β-diol-3-one-17-acetate, F. 175° C. (decomposed).

710 mg. of 2β-bromo-7α-methyl-5α-androstane-1α,17β-diol-3-one-17-acetate are dissolved in 20 ml. of tetrahydrofurane and methanol (1:1), 0.22 g. of sodium acetate and 0.15 ml. of glacial acetic acid are added. 0.1 g. $Pd/CaCO_3$ (10%) is prehydrogenated in 10 ml. tetrahydrofurane and methanol (1:1). The a.m. mixture is then hydrogenated[1] under normal conditions up to absorption of 1 molar equivalent of hydrogen. The catalyst is thereupon removed by filtration, the filtrate is concentrated in vacuo and the residue is recrystallized from isopropylether/acetone. There are obtained 500 mg. of 7α-methyl-5α-androstane-1α,17β-diol-3-one-17-acetate, M.P. 210 to 211° C. (decomposed).

*Example 2*

400 mg. of 7α,17α-dimethyl-$\Delta^1$-5α-androstene-17β-ol-3-one are dissolved in 10 ml. dioxane and to the solution there are added upon stirring at room temperature successively 1 ml. water, 0.1 ml. (70%) $HClO_4$ and 170 mg N-bromo-acetamide. After two hours one adds 2 ml. of a 5% $NaHSO_3$ solution and stirs the reaction product into ice water. The resulting crude product is removed by suction, washed and dried. One recrystallizes from isopropylether and obtains 2β-bromo-7α-17α-dimethyl-5α-androstane-1α,17β-diol-3-one.

827 mg. of the latter product are dissolved in 25 ml. of tetrahydrofurane and methanol (1:1). To the solution there are added 0.25 g. sodium acetate and 0.17 ml. glacial acetic acid. The reaction mixture is further reacted with 0.11 g. of $Pd/CaCO_3$ (10%) in 10 ml. tetrahydrofurane and methanol (1:1). This is followed by hydrogenation under normal conditions. After two hours, one molar equivalent of hydrogen has been absorbed. The product is removed by filtration from the catalyst, added upon stirring to ice water and extracted with methylene chloride. After washing, drying and concencentration, one recrystallizes the residue from $CH_2Cl_2$/isopropylether. One obtains 7α,17α-dimethyl-5α-androstane-1α,17β-diol-3-one. M.P. 183-183.5° C.

*Example 3*

800 mg. of 7α-methyl-$\Delta^1$-5α-androstene-17β-ol-3-one-17-propionate are reacted in accordance with Example 1 with hypobromic acid to form 2β-bromo-7α-methyl-5α-androstane-1α,17β-diol-3-one-17-propionate. The resulting product is then subjected to hydrogenation as in Example 1. There is obtained 7α-methyl-5α-androstane-1α,17β-diol-3-one-17-propionate. M.P. 169–171° C.

---

[1] In the presence of the prehydrogenated catalyst.

Example 4

4 g. of 7α-methyl-Δ¹-5α-androstene-17β-ol-3-one are dissolved in 80 ml. pyridine and are then added at 0° C. temperature upon stirring to a pyridine-chromic acid complex by dropper. The complex is obtained from 8 g. CrO₃ and 80 ml. pyridine. The reaction mixture is stirred for five hours at room temperature. The pyridine is then distilled off in vacuo and the residue which is taken up with methylene chloride is filtered over neutral Al₂O₃. After concentration of the methylene chloride solution there are obtained 3.5 g. of 7α-methyl-Δ¹-5α-androstene-3,17-dione. The pure substance, after recrystallization from isopropylether has a melting point of 190.5–192° C; UV: $\epsilon_{228}$=10,400.

3.2 g. of the last obtained product are dissolved in 93 ml. of dioxane and are reacted upon stirring at 0° C. successively with 9.3 ml. water, 0.93 ml. HClO₄ (70%) and 1.4 g. N-bromo-acetamide The reaction mixture is subjected to stirring for two hours at room temperature, followed by destruction of the excess of perchloric acid with dilute sodium sulphite solution The reaction mixture is added upon stirring to ice water and is extracted with methylene chloride. After washing, drying and concentration in vacuo chromotography is effected with silica gel. There are obtained 900 mg. 2β-bromo-7α-methyl-5α-androstane-1α-ol-3,17-dione; M.P. 182–186° C. (decomposed).

890 mg. of 2β-bromo-7α-methyl-5α-androstane-1α-ol-3,17-dione are dissolved in 30 ml. of tetrahydrofurane + MeOH (1+1). To the solution are added 0.3 g. sodium acetate and 0.18 ml. glacial acetic acid. After prehydrogenation of 116 mg. Pd/caCO₃ (10%) in 15 ml. tetrahydrofurane and methanol in the ratio of 1:1, the a.m. solution is further hydrogenated in the presence of prehydrogenated Pd/CaCO₃ (10%) catalyst until 1 molar equivalent of hydrogen has been absorbed. The product is then removed from the catalyst by filtration, is added by stirring to ice water, and is extracted with methylene chloride. After washing, drying and concentration in vacuo, chromatography is effected over silica gel. One obtains 345 mg. of 7α-methyl-5α-androstane-1α-ol-3,17-dione; M.P. 210–213° C.

334 mg. of this compound are dissolved in 5 ml. methylene chloride (absolute). 0.45 ml. ethylene glycol and 4.5 mg. of p-TsOH are added and stirred for 24 hours at room temperature. After adding the product by stirring to a dilute soda solution and extraction with methylene chloride one obtains 370 mg. of 7α-methyl-5α-androstane-1α-ol-3,17-dione-3-ethyleneketal. This product in pure condition after recrystallization from isopropylether has a melting point of 148–149° C. A Grignard solution is prepared from 2.4 g. magnesium, 31 ml. ether and 5.5 ml. methyliodide. To this solution there are added in a nitrogen atmosphere 370 mg. of the last mentioned ethyleneketal dissolved in 70 ml. absolute benzene. The reaction mixture is subjected to stirring at room temperature for five hours. After decomposition of the Grignard solution with saturated ammonium chloride solution and extraction with ether, one obtains 380 mg. 7α,17α-dimethyl-5α-androstane-1α,17β-diol-3-one-3-ethyleneketal. This product is dissolved in 51 ml. acetone and 25 mg. p-TsOH are added and the mixture is heated for one hour under nitrogen and upon reflux. It is then stirred into ice water and extracted with methylene chloride. After washing with a sodium bicarbonate solution and water, drying is effected over sodium sulfate followed by concentration in vacuo. After chromatography over silica gel, one obtains 190 mg. 7α,17α-dimethyl - 5α - androstane-1α,17β - diol - 3 - one; M.P. 183–183.5° C.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. 5α-androstanolone derivatives of the general formula

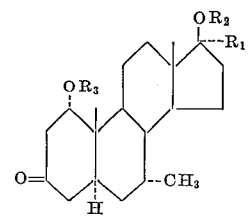

wherein $R_1$ is hydrogen or a lower alkyl group and $R_2$ and $R_3$ are hydrogen or residues of physiologically acceptable acids.

2. 7α - methyl - 5α - androstane - 1α,17β - diol - 3 - one-17-acetate.

3. 7α,17α-dimethyl - 5α - androstane - 1α - 17β-diol-3-one.

4. 7α - methyl - 5α - androstane - 1α - 17β - diol - 3-one-17-propionate.

References Cited by the Examiner

UNITED STATES PATENTS

| | | | |
|---|---|---|---|
| 3,118,916 | 1/1964 | Goedicke | 260—397.4 |
| 3,252,930 | 5/1966 | Smith et al. | 260—239.55 |

OTHER REFERENCES

Campbell et al.: Steroids, 1, pages 317–324 (1963).

LEWIS GOTTS, *Primary Examiner.*

T. M. MESHBESHER, *Assistant Examiner.*